United States Patent
Garbossa

(10) Patent No.: US 9,627,880 B2
(45) Date of Patent: Apr. 18, 2017

(54) ELECTRONIC SAFETY PATH

(71) Applicant: Infineon Technologies AG, Neubiberg (DE)

(72) Inventor: Cristian Garbossa, Bressanone (IT)

(73) Assignee: Infineon Technologies AG, Neubiberg (DE)

( * ) Notice: Subject to any disclaimer, the term of this patent is extended or adjusted under 35 U.S.C. 154(b) by 462 days.

(21) Appl. No.: 14/194,272

(22) Filed: Feb. 28, 2014

(65) Prior Publication Data
US 2015/0124363 A1 May 7, 2015

Related U.S. Application Data

(60) Provisional application No. 61/898,921, filed on Nov. 1, 2013.

(51) Int. Cl.
| | | |
|---|---|---|
| *H02H 3/20* | (2006.01) | |
| *H02H 9/04* | (2006.01) | |
| *B60L 1/00* | (2006.01) | |
| *B60L 3/00* | (2006.01) | |
| *B60L 3/04* | (2006.01) | |

(52) U.S. Cl.
CPC ............... *H02H 3/20* (2013.01); *B60L 1/00* (2013.01); *B60L 3/0084* (2013.01); *B60L 3/04* (2013.01); *H02H 9/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,751,976 A | * | 6/1988 | Higuchi | B62D 6/002 180/446 |
| 4,856,670 A | * | 8/1989 | Hang | B41M 1/34 220/2.1 A |
| 4,956,590 A | * | 9/1990 | Phillips | B62D 5/008 180/446 |
| 5,745,670 A | * | 4/1998 | Linde | H02J 1/14 307/64 |
| 6,208,923 B1 | * | 3/2001 | Hommel | B62D 5/001 180/400 |

(Continued)

OTHER PUBLICATIONS

"Automotive Safety Integrity Level," Wikipedia, the free encyclopedia, retrieved from http://en.wikipedia.org/w/index.php?title=Automotive_Safety_Integrity_Level&oldid=619299027 on Aug. 1, 2014, 5 pp.

(Continued)

*Primary Examiner* — Scott Bauer
(74) *Attorney, Agent, or Firm* — Shumaker & Sieffert, P.A.

(57) ABSTRACT

A system is described that includes a first portion including one or more components configured to implement one or more safety functions of an application. The system further includes, a second, different portion comprising one or more different components configured to activate a safety path in response to a detection of a voltage overstress in the first portion. The system further includes a third, different portion comprising one or more different components configured to electrically couple the first portion to the second portion and to prevent the voltage overstress from propagating from the first portion to the second portion.

20 Claims, 9 Drawing Sheets

(56) References Cited

U.S. PATENT DOCUMENTS

| | | | | |
|---|---|---|---|---|
| 6,693,405 | B2* | 2/2004 | Blanke | B62D 5/003 |
| | | | | 180/446 |
| 2014/0380001 | A1* | 12/2014 | Schubert | G06F 9/5077 |
| | | | | 711/153 |
| 2015/0040677 | A1* | 2/2015 | Hammerschmidt | G01L 1/18 |
| | | | | 73/774 |
| 2015/0331040 | A1* | 11/2015 | Bernon-Enjalbert | G06F 17/5045 |
| | | | | 324/750.3 |
| 2015/0340854 | A1* | 11/2015 | Richter | H02H 3/05 |
| | | | | 361/86 |

OTHER PUBLICATIONS

"ISO 26262," Wikipedia, the free encyclopedia, as of February retrieved from http://en.wikipedia.org/w/index.php?title=ISO_26262&oldid=616158032 on Aug. 1, 2014, 7 pp.

* cited by examiner

ELECTRONIC SAFETY PATH

This application claims the benefit of U.S. Provisional Application No. 61/898,921, filed Nov. 1, 2013, the entire content of which is incorporated herein by reference.

TECHNICAL FIELD

This disclosure relates to the electronic safety systems, and in particular, to electronic safety systems that protect against voltage overstress.

BACKGROUND

In modern automotive electronics, safety requirements are impacting semiconductor companies. For example, the ISO 26262 standard is becoming an important reference for ASIL projects (ASIL: Automotive Safety Integrity Level). Safety requirements may have a non-negligible impact in the development phase on many sensitive parameters, increasing the effort, die area, and the cost of the product.

SUMMARY

In general, the techniques described in this disclosure are related to achieving one or more safety goals of an application by activating a safety path in response to the detection of a voltage overstress. For example, there may be an overall safety goal for the application which the application may be rated to achieve at a safety level, however, one or more of the components of the application may be rated for a lower safety level. The techniques described in this disclosure may decompose the application into one or more components rated for a lower safety level, and include one or more safety paths such that overall safety goal of the application can be achieved. For instance, the safety path may prevent components which may be operationally compromised due to a voltage overstress from interfering with the achievement of the overall safety goal by bypassing such components.

In one example, a system includes a first portion that includes one or more components configured to implement one or more safety functions of an application, wherein the one or more of the components of the first portion are rated to withstand a supply voltage up to a first voltage level without sustaining a reduction in component lifetime, and wherein the one or more safety functions are associated with one or more safety goals. In this example, the system also includes a second, different portion comprising one or more different components configured to activate a safety path in response to a detection of a voltage overstress in the first portion, wherein the one or more of the components of the second portion are rated to withstand a supply voltage up to a second voltage level without sustaining a reduction in component lifetime, wherein the second voltage level is greater than the first voltage level, and wherein by activating the safety path in response to the detection of the voltage overstress, the one or more safety goals are achieved. In this example, the system also includes a third, different portion comprising one or more different components configured to electrically couple the first portion to the second portion and to prevent the voltage overstress from propagating from the first portion to the second portion.

In another example, a system includes a first portion comprising one or more means for implementing one or more safety functions of an application, wherein the means of the first portion are rated to withstand a supply voltage up to a first voltage level without sustaining a reduction in lifetime, and wherein the one or more safety functions are associated with one or more safety goals. In this example, the system also includes a second, different portion comprising means for activating a safety path in response to detecting a voltage overstress in the first portion, wherein the means of the second portion are rated to withstand a supply voltage up to a second voltage level without sustaining a reduction in lifetime, wherein the second voltage level is greater than the first voltage level, and wherein by activating the safety path in response to the detection of the voltage overstress, the one or more safety goals are achieved. In this example, the system also includes a third, different portion comprising means for electrically coupling the first portion to the second portion and to prevent the voltage overstress from propagating from the first portion to the second portion.

In another example, a method includes receiving, by a safety path controller, a signal from a signal generator, wherein the signal generator is included in a first portion of a system, and wherein the safety path controller is included in a second portion of the system, wherein the first portion comprises one or more components rated to operate up to a first voltage level, wherein the second portion comprises one or more components rated to operate up to a second voltage level, and wherein the second voltage level is greater than the first voltage level. In this example, the method also includes directing, by a sensor network, a voltage overstress in the first portion to a target component included in the first portion, wherein the target component electrically couples the signal generator to the safety path controller, and in response to receiving the voltage overstress, electrically decoupling, by the target component, the signal generator from the second portion such that the safety path controller is no longer able to receive the signal from the signal generator. In this example, the method also includes in response to detecting a change in the signal, activating, by the safety path controller, a safety path.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
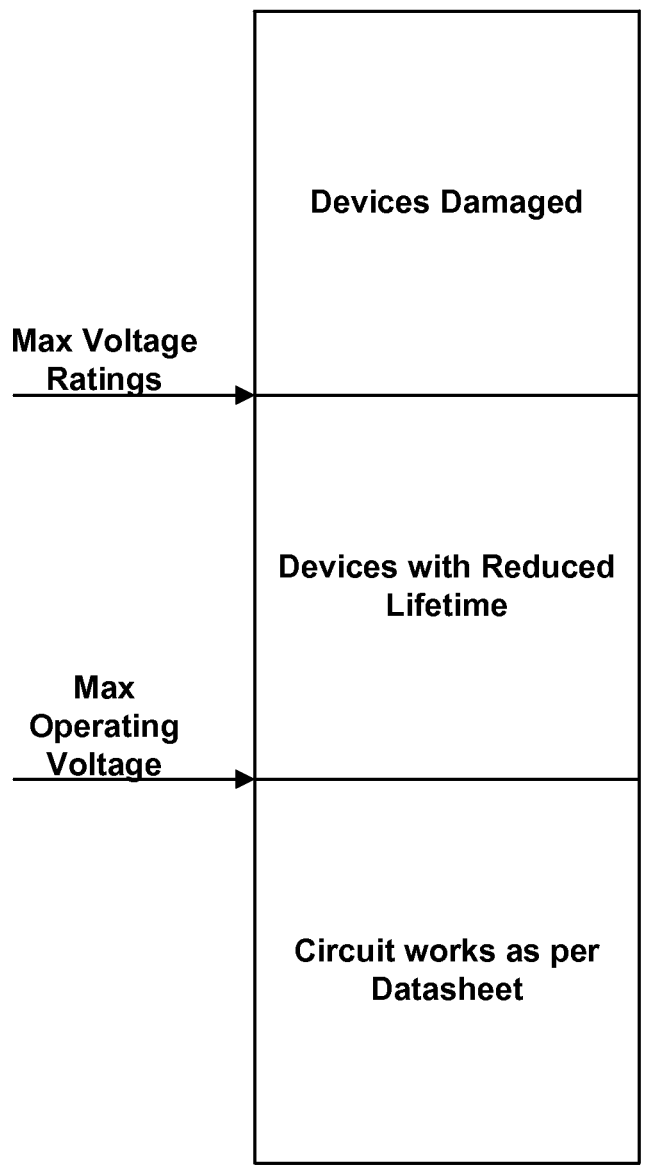
FIG. 1 is a conceptual diagram illustrating example effects of voltage levels on electronic devices.

An application, such as an application in an automotive environment, may include one or more functions. These functions may be classified as safety functions or non-safety functions. The functions classified as safety functions may be responsible for avoiding/preventing/reacting to failures that could compromise the application and, in some examples, which may generate an unreasonable risk or physical injury of people. Each safety function may have one or more associated safety goals. For instance, an application for power steering may include one or more safety functions that may be associated with a safety goal of avoiding erratic steering (e.g., if the driver turns the steering wheel right, the power steering system should not direct the vehicle left).

Each safety application may be assigned, since the beginning, a target Automotive Safety Integrity Level (ASIL) level. One operation that may be needed is to decompose the top ASIL level between the sub-blocks of the application. A proper decomposition of safety requirements in the application may help the designer of each sub-block to reduce the inherited requirements and greatly simplify the sub-systems. According to ISO 26262, after a "Hazard Analysis and Risk Assessment" the ASIL level may be identified together with the safety goals. A functional safety concept may derive the functional safety requirements from the safety goal and allocate them to the architecture. Additionally, one or more technical safety requirements may be derived from the functional safety requirements. Some examples of technical safety requirements may include, but are not limited to, a probability of violation of a safety goal (PVSG), a single point fault metric (SPFM), and a latent fault metric (LFM).

One function present in such applications is the safety path, i.e., a way to disconnect the application, endangered by a fault, so that the fault cannot propagate to the top application and create a severe hazard (e.g., to one or more human beings). In some applications, there may be two redundant safety paths that are controlled by two independent circuits.

Once decomposition is done and safety path(s) are identified, another common topic that the safety engineer may solve is how to guarantee the protection of identified safety functions against overstress event. Overstress event may be important as the overstress event may cause the affected circuits to malfunction and, in some examples, may result in a complete loss of control of the affected circuits.

In some systems, a "safety wrapper" may be created around the safety functions. This safety wrapper may include clamping structures/double switch path/high voltage interfaces in order to contain the overstress propagation to the safety related sub-blocks. This safety wrapper may function as a barrier to prevent any overvoltage in non-safety functions from propagating to the safety functions. In such systems, decomposition of the ASIL requirements may involve identifying the safety functions as areas to be protected against overvoltage.

However, creating a safety wrapper around all of the safety functions may require additional effort and may cause an increase in the number/size of protected structures that may be part of the wrapper in order to guarantee the correct functionalities of the safety functions. For example, in a high voltage path (which may be critical for overstress), doubling the switch may cause approximately quadruple area penalties and a proper/independent control of the safety switch. In a system with multiple safety switches, independent control is achieved where the operation of each switch is independent to e.g., avoid the scenario where an error in the operation of one switch neutralizes the operation of another switch. As another example, in a high frequency path, the timing may be critical in case of synchronous signals. Creating a safety wrapper in a high frequency path may cause degradation in signal synchronization. As another example, digital function, if safety related, may need to be split from other functions, if safety related. Such splitting may add simulation issues and likely require additional blocks to be developed.

Figure 8:
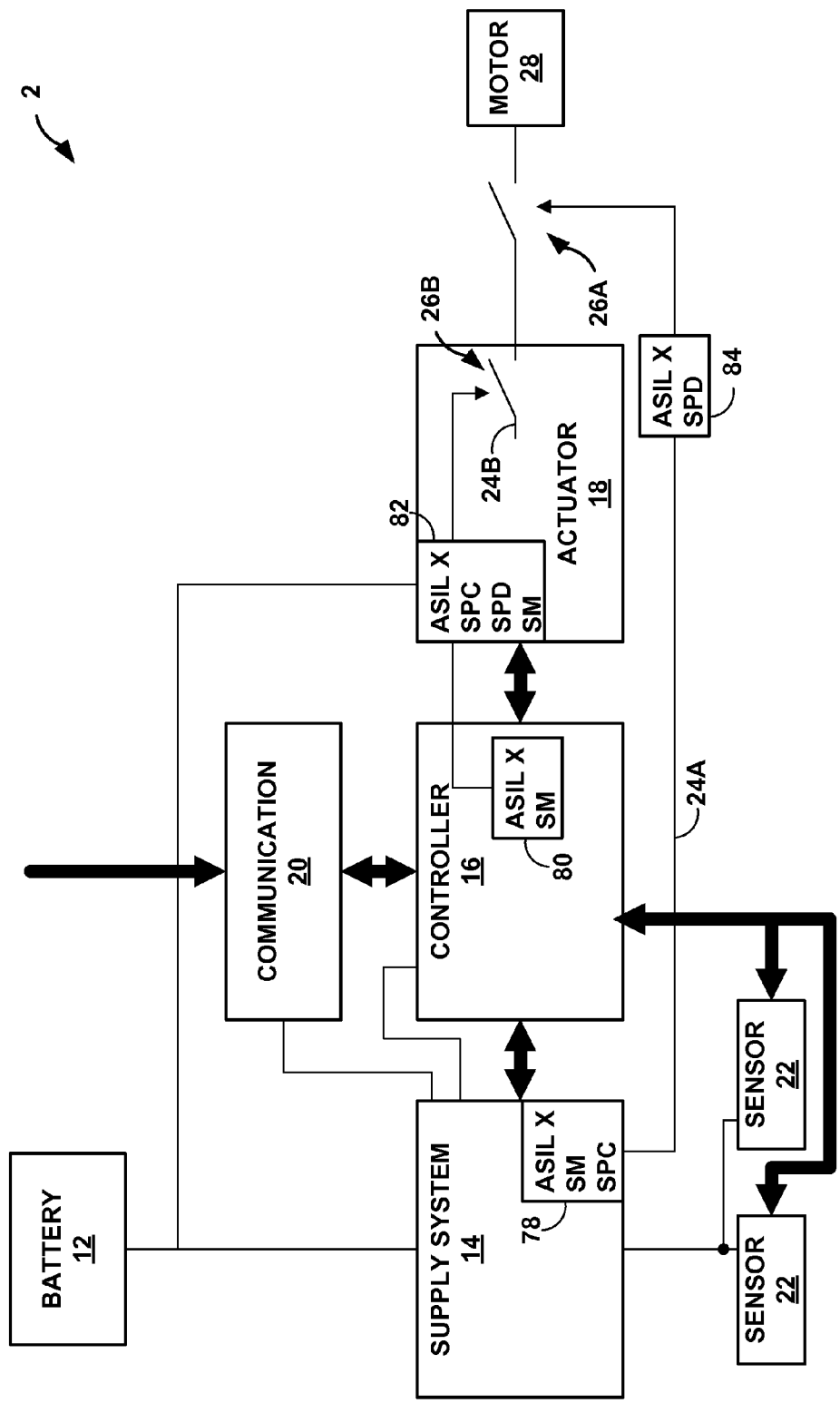
FIG. 8 is a block diagram illustrating an example system that performs an application in compliance with a safety level, in accordance with one or more aspects of the present disclosure.

In some examples, one aspect a system that includes a safety wrapper around all of the safety functions, may involve the decomposition of the ASIL requirements by assigning an ASIL level per component up to a battery level (that in automotive could be up to 40V). An example of such a system is illustrated in FIG. 8. In such examples, it may not be practical for assigning an ASIL level per component up to the battery level (i.e., for microcontrollers with max ratings up to 5V). This limitation is generating a new requirement for external overvoltage protection (additional hardware) or special overvoltage protection embedded on the other blocks (i.e., a power supply system) increasing the system complexity and costs. For instance, a significant amount of additional components may be required to assign an ASIL level up to 40V to a microcontroller that is only rated to 5V, because each interface may require safety wrapper components.

In some examples, a system may be protected against the effects of a voltage overstress by triggering a safety path generator that, in some examples, may be a simple buffer with a detection circuit. In such systems, the only interfaces which may include a safety wrapper may be the interfaces to the safety path generator (e.g., supply, ground, overstress detection input, and output voltage signaling).

One or more techniques of this disclosure may decompose the ASIL requirements for the system in a way to simplify the inherited requirements for single sub-blocks. In addition, one or more techniques of this disclosure may describe a new safety mechanism with respect to voltage overstress capable of controlling the safety path, which may minimize design effort and die area. This disclosure may provide one or more techniques to decompose the ASIL requirement of the system in a different way according to the overvoltage (OV) stress. In some examples, the decomposition up to max ratings of the sub-blocks can be done, and beyond the max rating the decomposition will focus only on the safety paths. In one example, the decomposition beyond the max rating will focus only on the safety paths because the safety paths need to detect the overstress and react to it disconnecting the application.

In some electronic systems, a voltage overstress may be assumed to propagate to the supply lines affecting all the circuit components coupled to the supply lines. For instance, if there is a voltage overstress in a first supply domain, then the voltage overstress will affect, and potentially damage or destroy, all of the circuit components connected to the first supply line. In some integrated circuits, there may be several supply domains (e.g., a low voltage supply domain, and one or more high voltage supply domains (depending on the technology)).

FIG. 1 is a conceptual diagram illustrating example effects of voltage levels on electronic devices. An electronic component has several voltage thresholds. For instance, a component will have a typical operating voltage level, maximum operating voltage level ("Max Operating Voltage"), and an absolute maximum voltage level ("Max Voltage Ratings"). When a component is subjected to a voltage level between the typical operating level and the maximum operating level, the component should perform as normal and is expected to work properly. When a component is subject to a voltage level between the maximum operating level and the absolute maximum level, the component may work with a reduced lifetime. Additionally, in such cases, the component could work correctly or could experience some malfunction. However, when a component is subject to a voltage level above the absolute maximum, the component will cease to function properly (e.g., "die").

One or more techniques of the disclosure relate to the detection of overvoltage. One or more of the techniques of the disclosure relate to the exploitation of the potential damages caused by a voltage overstress to trigger the activation of the safety path. For instance, one or more of the techniques of the disclosure may exploit a voltage overstress by directing the voltage overstress to a target component such that the target component is damaged by the voltage overstress. The techniques of this disclosure may reduce or eliminate the need to defend against a voltage overstress by using the voltage overstress and giving the voltage overstress a preferred path to a target point, such as a target component. In some examples, the voltage overstress may be given a preferred path to the target component via a matrix of sensors capable to react (by properly fusing a target net) in a way to activate the safety path. In some examples, the matrix of sensors may be distributed over the area of the circuit. In this way, the matrix of sensors may direct a voltage overstress occurring at any point of the circuit to the target component.

According to one or more techniques of this disclosure, an improved ASIL decomposition may be achieved by differentiating the decomposition between the safety path and the other safety functions, where the target of the safety application is the control of safety path (i.e., control of disconnection of the application in case of hazard). In some examples, the decomposition may be done in a different way with respect to overstress level voltage per component.

Figure 2:
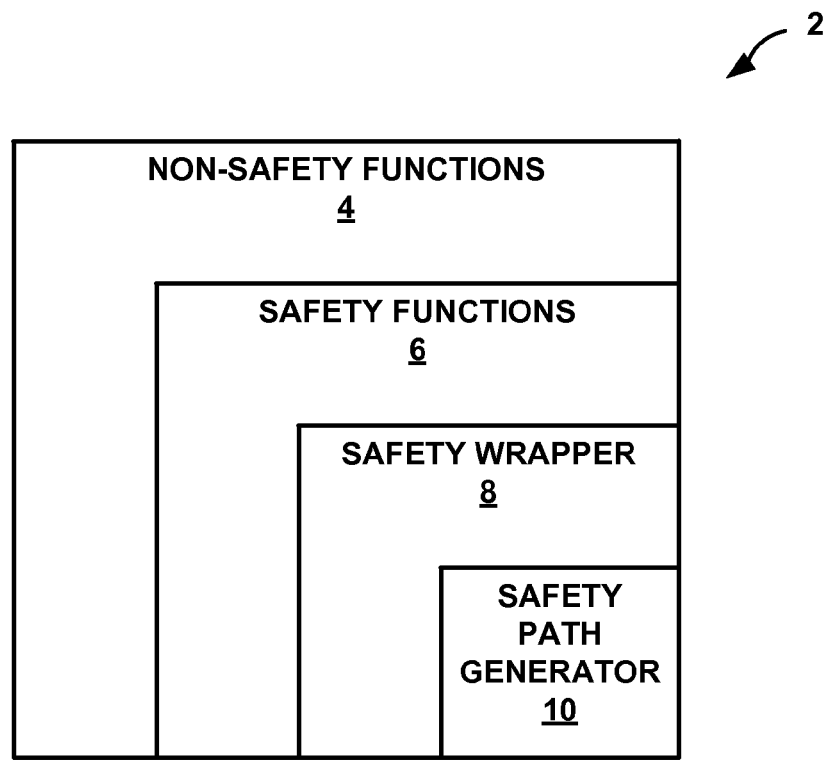
FIG. 2 is a conceptual diagram illustrating an example system that performs an application in compliance with a safety level, in accordance with one or more aspects of the present disclosure.

FIG. 2 is a conceptual diagram illustrating an example system 2 that performs an application in compliance with a safety level, in accordance with one or more aspects of the present disclosure. System 2 may be comprised of several portions. As illustrated in the example of FIG. 2, system 2 may include non-safety functions portion 4, safety functions portion 6, safety wrapper portion 8, and safety path generator portion 10 (collectively the "portions"). While illustrated in FIG. 2 as blocks of varying sizes, the actual physical size of the portions of system 2 may differ. For example, safety path generator portion 10 may include more and/or larger components than safety wrapper portion 8. Additionally, in some examples, system 2 may not include certain components, such as non-safety functions portion 4. Some examples of system 2 include, but are not limited to, circuit boards, processors, and application specific integrated circuits (ASIC).

Each of the portions may be part of different sub-blocks of the application. For example, some sub-blocks of the application may include a non-safety functions portion (such as non-safety functions 4), a safety functions portion (such as safety functions portion 6), a safety wrapper portion (such as safety wrapper portion 8), and a safety path generator portion (such as safety path generator portion 10). In some examples, other sub-blocks may not include all of the portions. For instance, some sub-blocks of the application may only include safety functions portion 6. In other words, some sub-blocks of the application may not include safety wrapper portion 8 and/or safety path generator portion 10.

Non-safety functions portion 4 may include one or components configured to support the application performed by system 2. Operation of the one or more components included in non-safety functions portion 4 may not be essential to ensuring that the one or more safety goals associated with the one or more safety functions.

Safety functions portion 6 may include one or more components configured to implement one or more safety functions of the application. For instance, safety functions portion 6 may include logic, such as a microcontroller, that implements one or more safety functions of the application.

Safety wrapper portion 8 may include one or more components configured to electrically couple a first portion to a second portion and to prevent a voltage overstress from propagating from the first portion to the second portion. In other words, as illustrated in FIG. 2, with respect to voltage overstress, safety wrapper portion 8 is a boundary that defines the area (i.e., safety path generator portion 10) where the overstress needs to be prevented and avoided. By protecting safety path generator portion 10 from a voltage overstress, safety wrapper portion 8 may enable safety path generator portion 10 to remain functional despite the occurrence of the voltage overstress Safety path generator portion 10 may include one or more components configured to activate a safety path. Further details of one example of a safety path are discussed below with respect to FIG. 3.

In accordance with one or more aspects of the disclosure, one or more components included in safety functions portion 6 may be subject to a voltage overstress. For instance, a supply voltage that supplies power to the one or more components in safety functions portion 6 may exceed a first voltage level. One or more components included in safety wrapper portion 8 may prevent the voltage overstress from propagating to the components of safety path generator portion 10. One or more components of safety path generator portion 10 may detect the voltage overstress (e.g., by receiving or ceasing to receive a signal from safety functions portion 6). In response to detecting the voltage overstress, the one or more components of safety path generator portion 10 may activate a safety path such that the one or more safety goals may be achieved.

Figure 3:
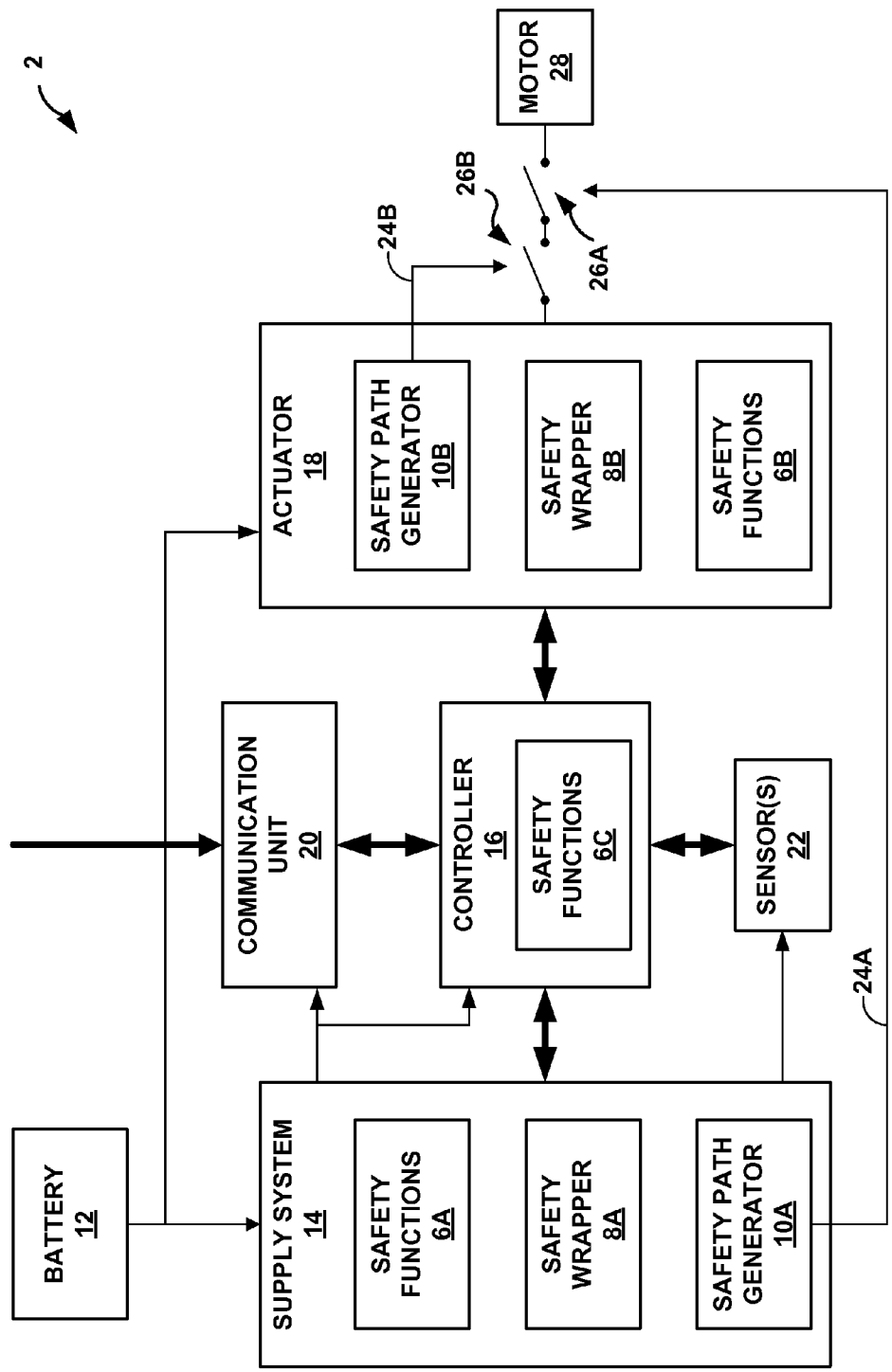
FIG. 3 is a block diagram illustrating further details of one example of a system as illustrated in FIG. 2, in accordance with one or more aspects of the present disclosure.

FIG. 3 is a block diagram illustrating further details of one example of system 2 of FIG. 2, in accordance with one or more aspects of the present disclosure. FIG. 3 illustrates only one particular example of system 2 as shown in FIG. 2, and many other example of system 2 may be used in other instances.

As shown in the example of FIG. 3, system 2 includes battery 12, supply system 14, controller 16, actuator 18, communication unit 20, one or more sensors 22, safety paths 24A and 24B (collectively "safety paths 24"), switch 26A, switch 26B (collectively, "switches 26"), and motor 28. In some examples, one or more of components 12, 14, 16, 18, 20, 22, 24, and 28 may be coupled (physically, communicatively, and/or operatively) for inter-component communications.

Battery 12, in one example, may be configured to output power to one or more components of system 2. In some examples, battery 12 may be a car battery. For instance, in automotive applications, battery 12 may provide approximately 10V-18V and the needed current to power the one or more components of system 2.

Supply system 14, in one example, may be configured to supply electrical power to other components of system 2. In other words, supply system 14 may be configured to create a local power management unit for the application. For example, supply system 14 converts the voltage received from battery 12 to the appropriate voltage level for the other components of system 2. As illustrated in FIG. 3, supply system 14 may include safety functions portion 6A, safety wrapper portion 8A, and safety path generator portion 10A.

Safety functions portion 6A may include one or more components configured to implement one or more safety functions of the application. The one or more components of safety function portion 6A may receive power at a supply voltage level. In some examples, the one or more components of safety function portion 6B may be rated to withstand a supply voltage up to a voltage level without sustaining a reduction in component lifetime. For instance, the one or more components of safety function portion 6A may have a lifetime of one million hours and be rated to withstand a supply voltage up to 40 volts without the lifetime of one million hours being reduced.

Safety wrapper portion 8A may include one or more components configured to electrically couple a first portion to a second portion and to prevent a voltage overstress from propagating from the first portion to the second portion. For example, safety wrapper portion 8A may include one or more components configured to electrically couple safety functions portion 6A to safety path generator portion 10A and to prevent a voltage overstress in safety functions portion 6A from propagating to safety path generator portion 10A. Some examples of the one or more components included in safety wrapper portion 8A may include, but are not limited to, clamping elements, single switches, and redundant switches. In other words, as illustrated in FIG. 2, with respect to voltage overstress, safety wrapper portion 8A is a boundary that defines the area (i.e., safety path generator portion 10A) where the overstress needs to be prevented and avoided. By including safety wrapper portion 8A around safety path generator portion 10A and not safety functions portion 6A, simpler circuitry, and less space may be needed to achieve a safety level.

Safety path generator portion 10A may include one or more components configured to activate a safety path, such as safety path 24A. In some examples, the one or more components of safety path generator portion 10A may activate the safety path in response to a detection of a voltage overstress in another portion. For instance, the one or more components of safety path generator portion 10A may activate safety path 24A in response to a detection of a voltage overstress in non-safety functions portion 4A and/or safety functions portion 6A. In some examples, by activating safety path 24A, safety path generator portion 10A may ensure that one or more of the safety goals are achieved.

Controller 16, in one example, may be configured to control one or more components of system 2. In other words, controller 16 may be configured to implement the intelligence of an application system. In some examples, controller 16 may collect information coming from the surrounding (sensors 22, communication unit 20), elaborate them (e.g., process the information) and react controlling properly actuators (e.g., control actuator 18). As illustrated in FIG. 3, controller 16 may include safety functions portion 6C.

Safety functions portion 6C may be similar to safety functions portion 6A. For instance, safety functions portion 6C may include one or more components configured to implement one or more safety functions of the application. In some examples, safety functions portion 6C may include a microcontroller.

Actuator 18, in one example, may be configured to output a signal to control motor 28. As illustrated in FIG. 3, actuator 18 may include safety functions portion 6B, safety wrapper portion 8B, and safety path controller 10B.

Safety functions portion 6B may be similar to safety functions portion 6A. For instance, safety functions portion 6B may include one or more components configured to implement one or more safety functions of the application.

Safety wrapper portion 8B may be similar to safety wrapper portion 8A. For instance, safety wrapper portion 8B may include one or more components configured to electrically couple safety functions portion 6B to safety path generator portion 10B and to prevent a voltage overstress in safety functions portion 6B from propagating to safety path generator portion 10B.

Safety path generator portion 10B may be similar to safety path generator portion 10A. For instance, safety path generator portion 10B may include one or more components configured to activate a safety path, such as safety path 24B.

Actuator 18, in one example, may be configured to physically implement a purpose of an application (i.e., controlling a motor such as motor 28 for moving something).

Communication unit 20, in one example, may be configured to manage communications between system 2 and other systems and/or devices. In some examples, communication unit 20 may be configured to link a local application to a main vehicle central system.

System 2, in some examples, also includes one or more sensors 22 which may be configured to sense the status of one or more components of system 2. In other words, sensors 22 may be configured to translate physical information to controller 16. For instance, where system 2 is configured to implement power steering, one or more of sensors 22 may be configured to sense the position of the steering wheels.

Safety paths 24, in one example, may be configured to receive a signal from a safety path generator. For example, safety path 24A may receive a signal from safety path generator 10A. In response to receiving the signal, safety paths 24 may be configured to output a signal to switches 26.

Switches 26, in one example, may be configured to electrically decouple motor 28 from actuator 18. Each of switches 26 may be controlled by safety paths 24. For instance, switches 26 may receive a signal from one or both of safety paths 24 that causes one or both of switches 26 to "open" and electrically decouple motor 28 from actuator 18 such that actuator 18 is no longer able to control motor 28. In some examples, each of switches 26 may be independently controlled by one of safety paths 24. For instance, switch 26A may be controlled by safety path 24A and switch 26B may be controlled by safety path 24B.

Motor 28, in one example may be configured to receive a signal from actuator 18. Where system 2 implements the application of power steering, motor 28 may be configured to assist a driver with turning the steering wheels of a vehicle.

In accordance with one or more aspects of the present disclosure, one or more components of safety path generator portion 10A may receive a signal from a signal generator of safety functions portion 6A. One or more of the components of safety functions portion 6A may be rated to withstand a supply voltage up to a first voltage level without sustaining a reduction in component lifetime. A supply voltage in safety functions portion 6A may exceed the first voltage level. In other words, one or more components included in safety functions portion 6 may be subject to a voltage overstress. One or more components of safety path generator portion 10A may detect that the supply voltage in safety functions portion 6A has exceeded the first voltage level. In response to detecting that the supply voltage in safety functions portion 6A has exceeded the first voltage level (i.e., detecting that there is a voltage overstress in safety functions portion 6A), one or more components of safety path generator portion 10A may activate safety path 24A. For instance, one or more components of safety path generator portion 10A may send a signal to switch 26A via safety path 24A that causes switch 26A to "open" and decouple actuator 18 from motor 28. In this way, rather than requiring every component of system 2 to be rated up to voltage of battery 12, system 2 can include components rated to lower voltages while still performing the application in compliance with the safety level.

For example, by activating the safety path, safety path generator portion 10A may reduce the probability that the application will malfunction as a result of the voltage overstress. By decomposing the requirements in this way, a reduction may be achieved in both the overall system area and the effort needed to design the system. For instance, this system may include fewer high voltage interfaces and fewer circuits that need to be protected against overvoltage (i.e., as opposed to including a safety wrapper around safety functions portion 6A). Additionally, this may bring, as a consequence, a reduction of the probability of fault inside the system.

Actuator 18 may react to a voltage overstress in a similar way to supply system 14. In other words, safety functions portion 6B and safety path controller 10B may perform similar operations to safety functions portion 6A and safety path generator 10A. For instance, one or more components of safety path generator portion 10B may detect a voltage overstress in safety functions portion 6B. In response to detecting the voltage overstress in safety functions portion 6B, one or more components of safety path generator portion 10B may send a signal to switch 26B via safety path 24B that causes switch 26B to "open" and decouple actuator 18 from motor 28.

Figure 4:
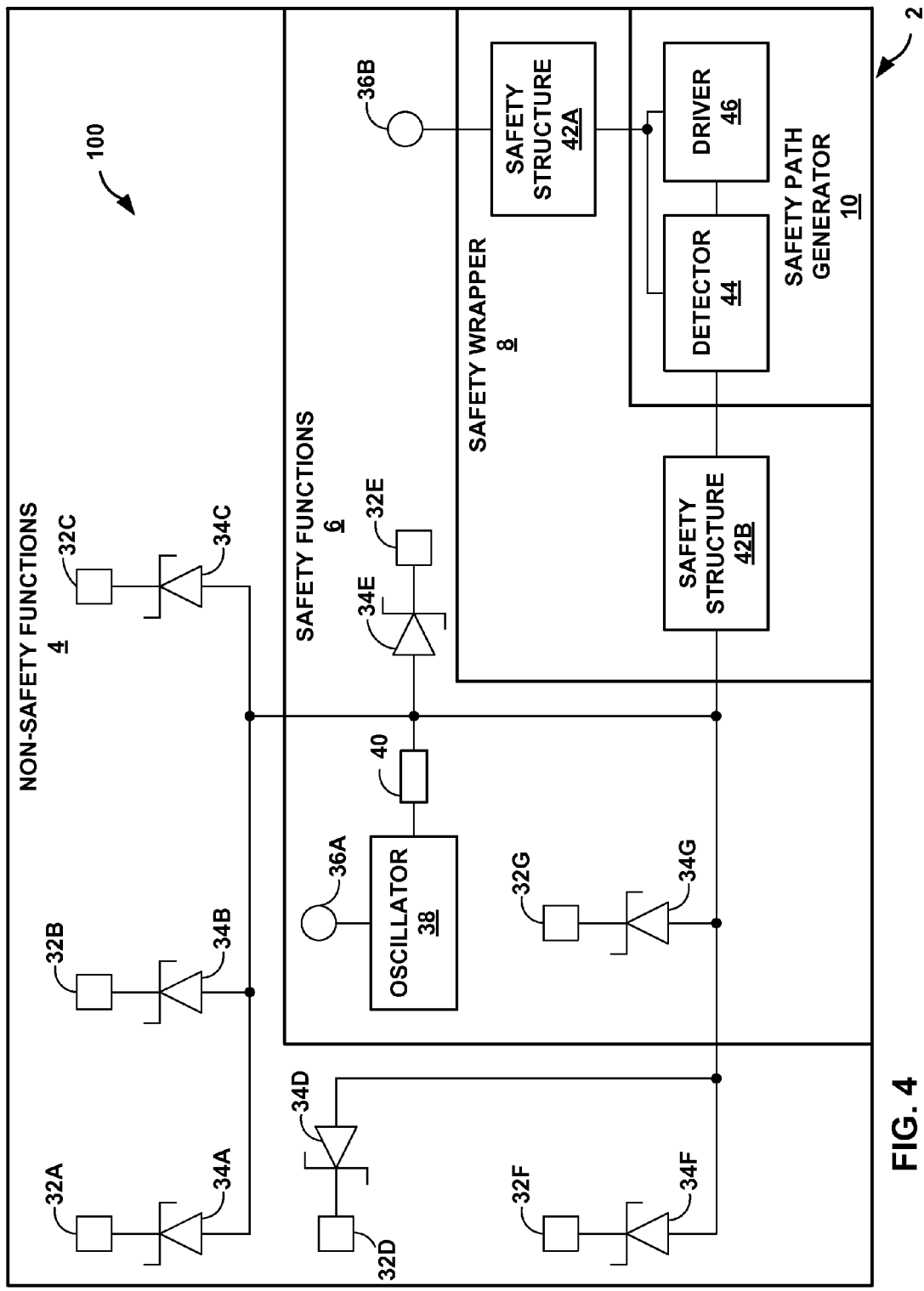
FIG. 4 is a block diagram illustrating further details of one example of a system as illustrated in FIG. 2, in accordance with one or more aspects of the present disclosure.

FIG. 4 is a block diagram illustrating further details of one example of system 2 as shown in FIG. 2, in accordance with one or more aspects of the present disclosure. As illustrated in FIG. 4, system 2 may include high voltage domain monitoring system 100. In the example of FIG. 4, high voltage domain monitoring system 100 may include a sensor network comprising one or more components 34A-34G (collectively "components 34"), oscillator 38, target component 40, one or more safety structures 42A and 42B (collectively "safety structures 42"), detector 44, and driver 46. System 2 may also include one or more high voltage domain contact points 32A-32G (collectively "high voltage contact points 32"), and one or more low voltage domain contact points 36A and 36B (collectively "low voltage contact points 36").

As illustrated in FIG. 4, system 2 may include a sensor network configured to direct a voltage overstress to target component 40. The sensor network may include components 34, illustrated in FIG. 4 as zener diodes, which may provide a path from high voltage contact points 32 to target component 40. In some examples, components 34 may be distributed across non-safety functions portion 4 and safety functions portion 6. In other examples, components 34 may be included in safety functions portion 6.

System 2 may include one or more safety structures 42 which may be configured to prevent a voltage overstress in safety functions portion 6 from propagating into safety path generator portion 10. In some examples, one or more of safety structures 42 may be configured to electrically couple one or more components in safety functions portion 6 and/or non-safety functions portion 4 to one or more components in safety path generator portion 10. For instance, safety structure 42A may electrically couple low voltage contact point 36B with detector 44 and/or driver 46. Additionally, safety structure 42B may electrically couple target component 40 to detector 44. Some examples of safety structures 42 may include, but are not limited to, clamping elements, redundant switches, and/or single switches. As illustrated in FIG. 4, safety structures 42 may be located in safety wrapper portion 8.

System 2 may include oscillator 38 which may be configured to output a signal. Oscillator 38 may be electrically coupled to, and draw power from, low voltage contact point 36. As illustrated in the example of FIG. 4, oscillator 38 may be positioned in safety functions portion 6. In other examples, oscillator 38 may be positioned in other portions, such as non-safety functions portion 4. In some examples, oscillator 38 may be a signal generator configured to generate a signal such as a toggling signal.

System 2 may include target component 40 which may be configured to electrically couple oscillator 38 to one or more components in safety path generator portion 10. In the example of FIG. 4, target component 40 electrically couples oscillator 38 to detector 44 via safety structure 42B. In some examples, target component 40 is configured to electrically decouple the signal generator from one or more component in safety path generator portion 10, such as detector 44, in response to sustaining a voltage overstress. In some examples, target component 40 may comprise a fuse. In such examples, target component 40 may "burn out" in response to sustaining a voltage overstress.

System 2 may include detector 44 which may be configured to detect a signal output by one or more components of system 2, such as one or more components positioned in safety functions portion 6 or non-safety functions portion 4. For example, detector 44 may be configured to detect a signal output by oscillator 38. In some examples, detector 44 may be configured to detect a dynamic signal (i.e., detector 44 may comprise a buffer stage plus a frequency detector). In some examples, such as where the signal output by oscillator 38 is a toggling signal, detector 44 may be configured to determine that the signal has ceased toggling. Detector 44 may be configured to output a signal to driver 46 in response to determining that the signal has changed. For instance, detector 44 may output a signal to driver 46 in response to determining that detector 44 is no longer receiving the signal from oscillator 38. As illustrated in the example of FIG. 4, detector 44 may be positioned in safety path generator portion 10.

System 2 may include driver 46 which may be configured to activate a safety path in response to receiving a signal from detector 44. As illustrated in the example of FIG. 4, driver 46 may be positioned in safety path generator portion 10. In some examples, a single device may include the functionality of both detector 44 and driver 46.

In accordance with one or more techniques of this disclosure, oscillator 38 may output a signal to detector 44, the reception of which indicates the absence of a voltage overstress. Subsequently, a high voltage supply level at one or more of high voltage contact points 32 may exceed a threshold. In other words, the high voltage supply domain may experience an overvoltage/voltage overstress. The sensor network may direct the voltage overstress to target component 40. In response to receiving the voltage overstress, target component 40 may decouple oscillator 38 from detector 44 so that detector 44 is no longer able to receive the signal from oscillator 38. In response to detecting the change in the signal (i.e., that the signal is no longer being received), detector 44 may output a signal to driver 46. In response to receiving the signal from detector 44, driver 46 may output a signal that causes a safety path (e.g., safety path 24) to activate. The activation of the safety path may result in the application implemented by system 2 being disconnected. In this way, despite the occurrence of the voltage overstress, system 2 still "fails safe".

Figure 5:
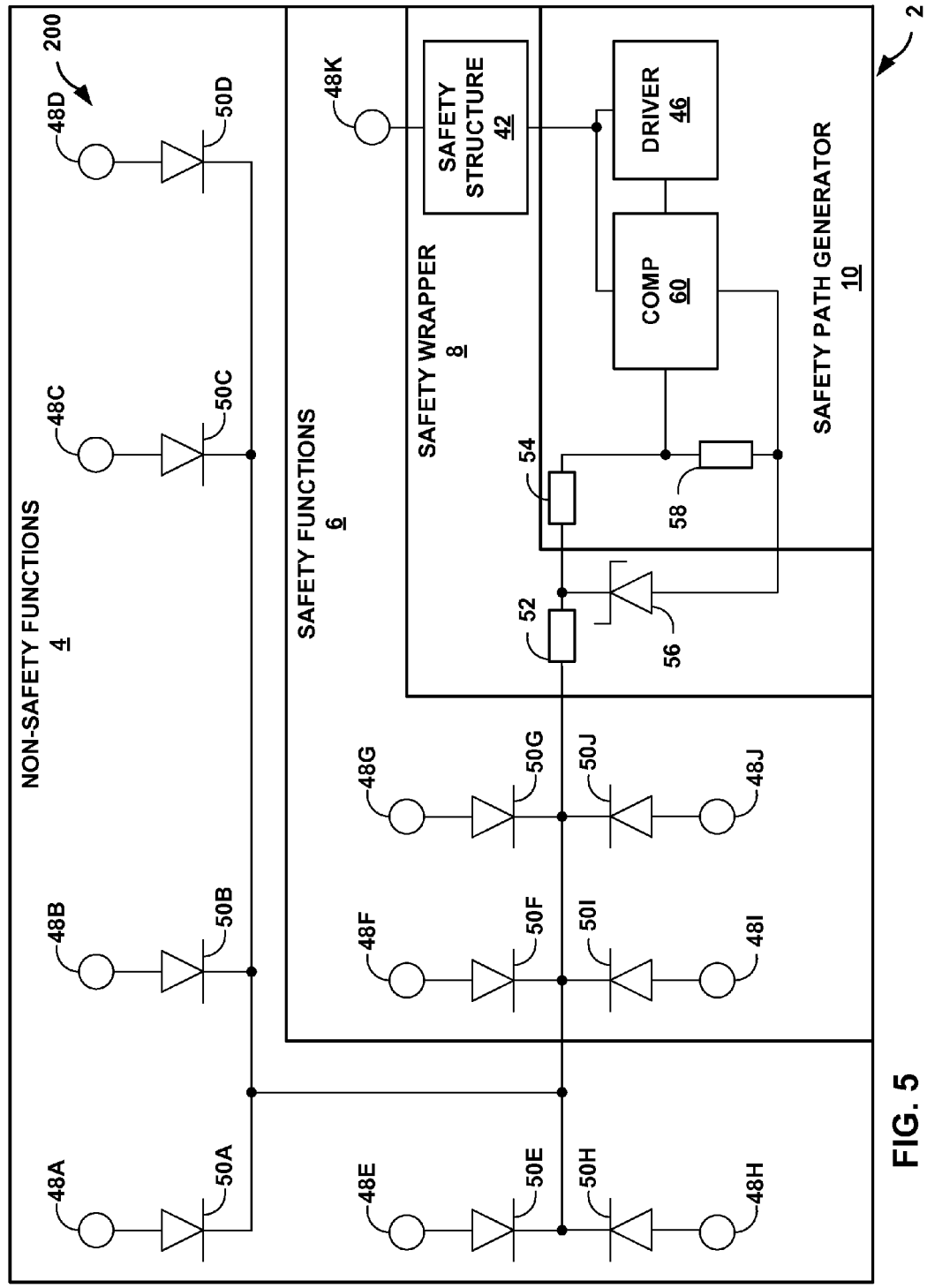
FIG. 5 is a block diagram illustrating further details of one example of a system as illustrated in FIG. 2, in accordance with one or more aspects of the present disclosure.

FIG. 5 is a block diagram illustrating further details of one example of system 2 as shown in FIG. 2, in accordance with one or more aspects of the present disclosure. As illustrated in FIG. 5, system 2 may low voltage domain monitoring system 200. In the example of FIG. 5, low voltage domain monitoring system 200 may include a sensor network comprising one or more components 50A-50J (collectively "components 50"), one or more low voltage domain contact points 48A-48K (collectively "low voltage contact points 48"), resistor 52, resistor 54, diode 56, resistor 58, safety structure 42, driver 46, and comparator 60.

As illustrated in FIG. 5, system 2 may include a sensor network configured to direct a voltage overstress to safety path generator portion 10. The sensor network may include components 50, illustrated in FIG. 5 as diodes, which may provide a path from low voltage contact points 48 to safety path generator portion 10. In other words, the sensor network may report the overstress to a single net that will be fed into the detection interface of the safety path generator. In some examples, components 50 may be distributed across non-safety functions portion 4 and safety functions portion 6. In other examples, components 50 may be included in safety functions portion 6. By distributing components 50, system 2 may be able to reduce the time needed to respond to a voltage overstress.

System 2 may include safety structure 42 which may be configured to prevent a voltage overstress in safety functions portion 6 from propagating into safety path generator portion 10. In some examples, safety structure 42 may be configured to electrically couple one or more components in safety functions portion 6 and/or non-safety functions portion 4 to one or more components in safety path generator portion 10. For instance, safety structure 42 may electrically couple low voltage contact point 48K with comparator 60 and/or driver 46. Some examples of safety structure 42 may include, but are not limited to, clamping elements, redundant switches, and/or single switches. As illustrated in FIG. 5, safety structure 42 may be located in safety wrapper portion 8.

System 2 may include comparator 60 which may be configured to detect a voltage overstress. In some examples, comparator 60 may be a BG comparator. For instance, comparator 60 may include a band gap voltage reference attached to a first input of a comparator. In such examples, comparator 60 may compare a voltage signal across resistor 58 with the voltage signal received from the band gap voltage reference to determine whether or not a voltage overstress is or has occurred. Comparator 60 may be configured to output a signal to driver 46 in response to determining detecting the voltage overstress. For instance, comparator 60 may output a signal to driver 46 in response to determining a first input voltage is greater than a second input voltage. As illustrated in the example of FIG. 5, comparator 60 may be positioned in safety path generator portion 10.

In accordance with one or more techniques of this disclosure, comparator 60 may detect a voltage overstress via the sensor network. In response to detecting the voltage overstress, comparator 60 may output a signal to driver 46. In response to receiving the signal from comparator 60, driver 46 may activate a safety path. In this way, system 2 may precisely monitor the low voltage domain in order to activate the safety path as soon as the voltage goes out from max operating voltage, where the circuits will work with reduced lifetime and performance.

Figure 6:
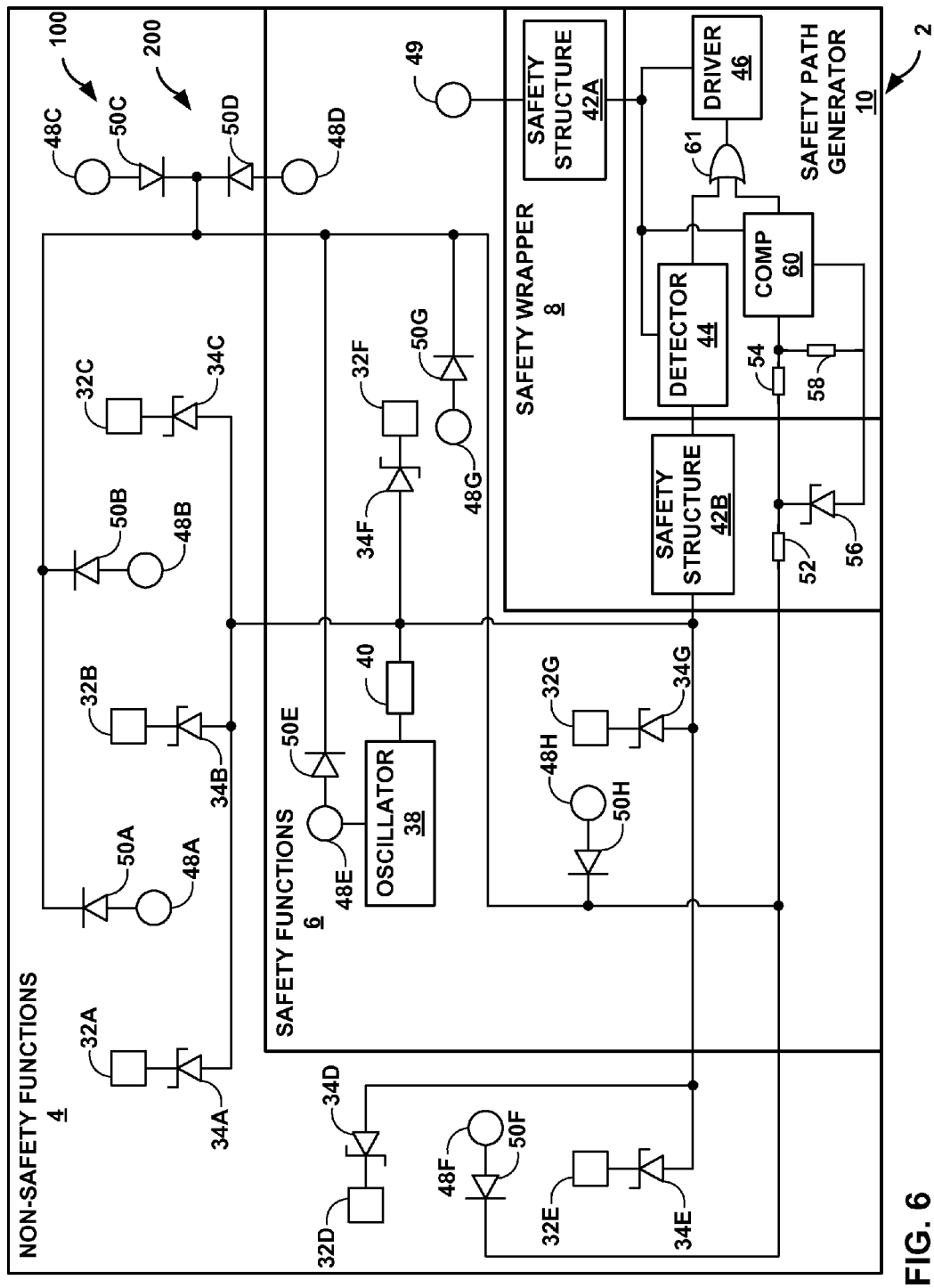
FIG. 6 is a block diagram illustrating further details of one example of a system as illustrated in FIG. 2, in accordance with one or more aspects of the present disclosure.

FIG. 6 is a block diagram illustrating further details of one example of system 2 as shown in FIG. 2, in accordance with one or more aspects of the present disclosure. As illustrated in FIG. 6, system 2 may include high voltage domain monitoring system 100, low voltage domain monitoring system 200, driver 46, and OR gate 61. System 2 may also include one or more high voltage domain contact points 32A-32G (collectively "high voltage contact points 32"), and one or more low voltage domain contact points 48A-48H (collectively "low voltage domain contact points 48").

As illustrated in FIG. 6, high voltage domain monitoring system 100 may include a high voltage sensor network comprising one or more components 34A-34G (collectively "HV components 34"), oscillator 38, target component 40, one or more safety structures 42A and 42B (collectively "safety structures 42"), and detector 44. High voltage domain monitoring system 100 may include functionality similar to high voltage domain monitoring system 100 of FIG. 4. For example, detector 44 of high voltage domain monitoring system 100 may be configured to output a signal in response to detecting a voltage overstress. In the example of FIG. 6, detector 44 may be configured to output a signal to OR gate 61 in response to detecting a voltage overstress.

As illustrated in FIG. 6, low voltage domain monitoring system 200 may include a low voltage sensor network comprising one or more components 50A-50H (collectively "LV components 50"), resistor 52, resistor 54, diode 56, resistor 58, safety structure 42, driver 46, and comparator 60. Low voltage domain monitoring system 200 may include functionality similar to low voltage domain monitoring system 200 of FIG. 5. For example, comparator 60 of low voltage domain monitoring system 200 may be configured to output a signal in response to detecting a voltage overstress. In the example of FIG. 6, comparator 60 may be configured to output a signal to OR gate 61 in response to detecting a voltage overstress.

HV components 34 and LV components 50 may form a distributed sensor network that covers both a low voltage supply domain and a high voltage supply domain. In some examples, system 2 may include additional sensor networks to cover additional supply domains. For instance, system 2 may include a medium voltage sensor network configured to detect a voltage overstress in a medium voltage supply domain. In this way, system 2 may detect voltage overstress events occurring in different supply domains and voltage overstress events occurring at different areas (e.g., different areas of a die).

OR gate 61 may be configured to receive a signal from either or both of detector 44 and comparator 60. In response to receiving the signal, OR gate 61 may be configured to output a signal to driver 46 that causes driver 46 to activate a safety path.

In accordance with one or more techniques of this disclosure, detector 44 may detect a voltage overstress in the high voltage domain and/or comparator 60 may detect a voltage overstress in the low voltage domain. In response to either or both of detector 44 or comparator 60 detecting a voltage overstress in their respective domains, detector 44 or comparator 60 may output a signal to OR gate 61. In response to receiving either or both signals, OR gate 61 may output a signal to driver 46. In response to receiving the signal from OR gate 61, driver 46 may activate a safety path. The activation of the safety path may result in the application implemented by system 2 being disconnected. In this way, despite the occurrence of the voltage overstress, system 2 still "fails safe".

Figure 7:
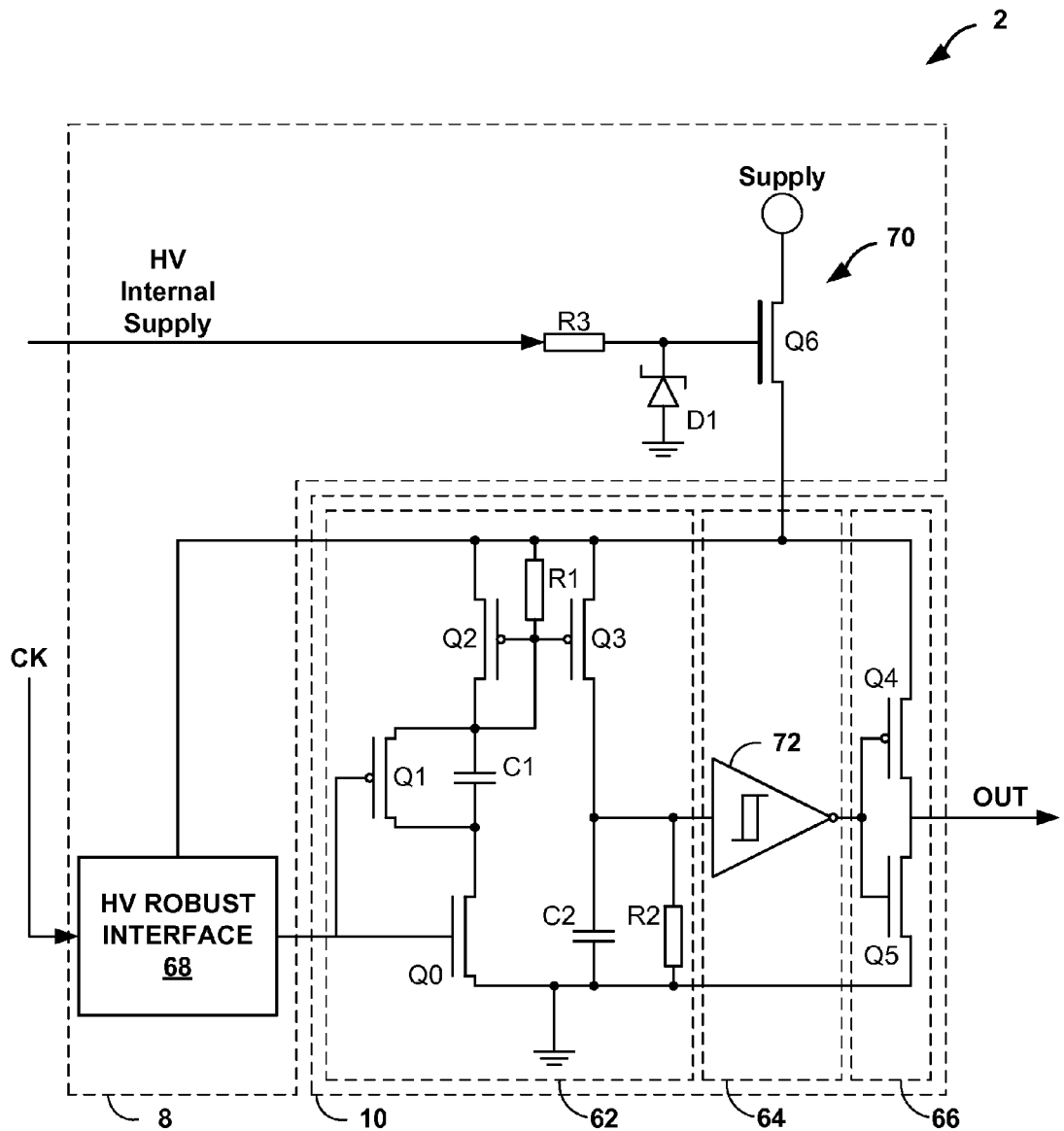
FIG. 7 is a block diagram illustrating further details of one example of a system as illustrated in FIG. 2, in accordance with one or more aspects of the present disclosure.

FIG. 7 is a block diagram illustrating further details of one example of system 2 as shown in FIG. 2, in accordance with one or more aspects of the present disclosure. As illustrated in FIG. 7, system 2 may include safety wrapper portion 8 and safety path generator portion 10.

As illustrated in FIG. 7, safety wrapper portion 8 may include high voltage robust interface 68, and power supply interface 70. Power supply interface 70 may be configured to supply power to one or more components of system 2. High voltage robust interface 68 may be configured to receive power from power supply interface 70. High voltage robust interface 68 may be configured to receive a signal, illustrated as "CK." High voltage robust interface 68 may be configured to prevent a voltage overstress in other portions of system 2 from propagating to safety path generator portion 10.

As illustrated in FIG. 7, safety path generator portion 10 may include clock detector portion 62, squarer portion 64, and driver portion 66. Clock detector portion 62 may be configured to receive a signal from other components of system 2 via high voltage robust interface 68. Clock detector portion 62 may be configured to determine whether or not the received signal includes a particular frequency. As illustrated in FIG. 7, clock detector portion 62 may include transistors Q0, Q1, Q2, and Q3; capacitors C1, and C2; and resistors R1, and R2. The components illustrated in clock detector portion 62 represent only one example of clock detector portion 62, and other configurations are possible. Clock detector portion 62 may be configured to output a signal in response to determining that the received signal does not include a particular frequency. For instance, clock detector portion 62 may be configured to output a signal to squarer portion 64 in response to determining that CK does not include a particular frequency.

Squarer portion 64 may be configured to receive a signal from clock detector portion 62. As illustrated in the example of FIG. 7, squarer portion 64 may include amplifier 72. Amplifier 72 may be configured to process the received signal. For instance, amplifier 72 may be configured to implement a hysteresis. In some examples, amplifier 72 may implement a Schmitt trigger to e.g., prevent cross conduction. The components illustrated in squarer portion 64 represent only one example of squarer portion 64, and other configurations are possible. Squarer portion 64 may be configured to output a signal to driver portion 66.

Driver portion 66 may be configured to receive a signal from squarer portion 64. Driver portion 66 may be configured to output a signal that activates a safety path in response to receiving the signal from squarer portion 64. As illustrated in FIG. 7, driver portion 66 includes transistors Q4, and Q5. The components illustrated in driver portion 66 represent only one example of driver portion 66, and other configurations are possible.

FIG. 8 is a block diagram illustrating an example system that performs an application in compliance with a safety level, in accordance with one or more aspects of the present disclosure. As illustrated in the example of FIG. 8, system 2 may include battery 12, supply system 14, controller 16, actuator 18, communication 20, ones or more sensors 22, first safety path 24A, second safety path 24B, and motor 28.

In some examples, supply system 14 may include block 78 which may include a safety mechanism (SM), and a safety path controller (SPC). In some examples, the components of block 78 may be assigned an arbitrary ASIL level of X.

In some examples, controller 16 may include block 80 which may include a safety mechanism (SM). In some examples, the components of block 80 may be assigned an arbitrary ASIL level of X. In some examples, the ASIL level assigned to the components of block 80 may be the same as the ASIL level assigned to the components of block 78. In some examples, the ASIL level assigned to the components of block 80 may be different than the ASIL level assigned to the components of block 78.

In some examples, actuator 18 may include block 82, and second safety path 24B. In some examples, block 82 may include a safety mechanism (SM), a safety path controller (SPC), and a safety path driver (SPD). In some examples, the components of block 82 may be assigned an arbitrary ASIL level of X. In some examples, the ASIL level assigned to the components of block 82 may be the same as the ASIL level assigned to the components of block 78 and/or block 80. In some examples, the ASIL level assigned to the components of block 82 may be different than the ASIL level assigned to the components of block 78 and/or block 80. In some examples, second safety path 24B may include switch 26B. In some examples, switch 26B may be configured to disconnect actuator 18 from motor 28. For instance, switch 26B may be configured to disconnect actuator 18 from motor 28 in response to the activation of second safety path 24B by the safety path driver included in block 82.

In some examples, first safety path 24A may include block 84, and switch 26A. In some examples block 84 may include a safety path driver (SPD). In some examples, the ASIL level assigned to the components of block 84 may be the same as the ASIL level assigned to the components of block 78, 80 and/or block 82. In some examples, the ASIL level assigned to the components of block 84 may be different than the ASIL level assigned to the components of block 78, 80 and/or block 82. In some examples, switch 26A may be configured to disconnect actuator 18 from motor 28. For instance, switch 26A may be configured to disconnect actuator 18 from motor 28 in response to the activation of first safety path 24A by the safety path driver included in block 84.

In the example of FIG. 8, each of the safety mechanisms, the safety path controllers, and the safety path drivers may be rated to withstand a supply voltage up to the battery voltage without sustaining a reduction in component lifetime. In this way, the system of the example of FIG. 8 may perform the application in compliance with the safety level.

Figure 9:
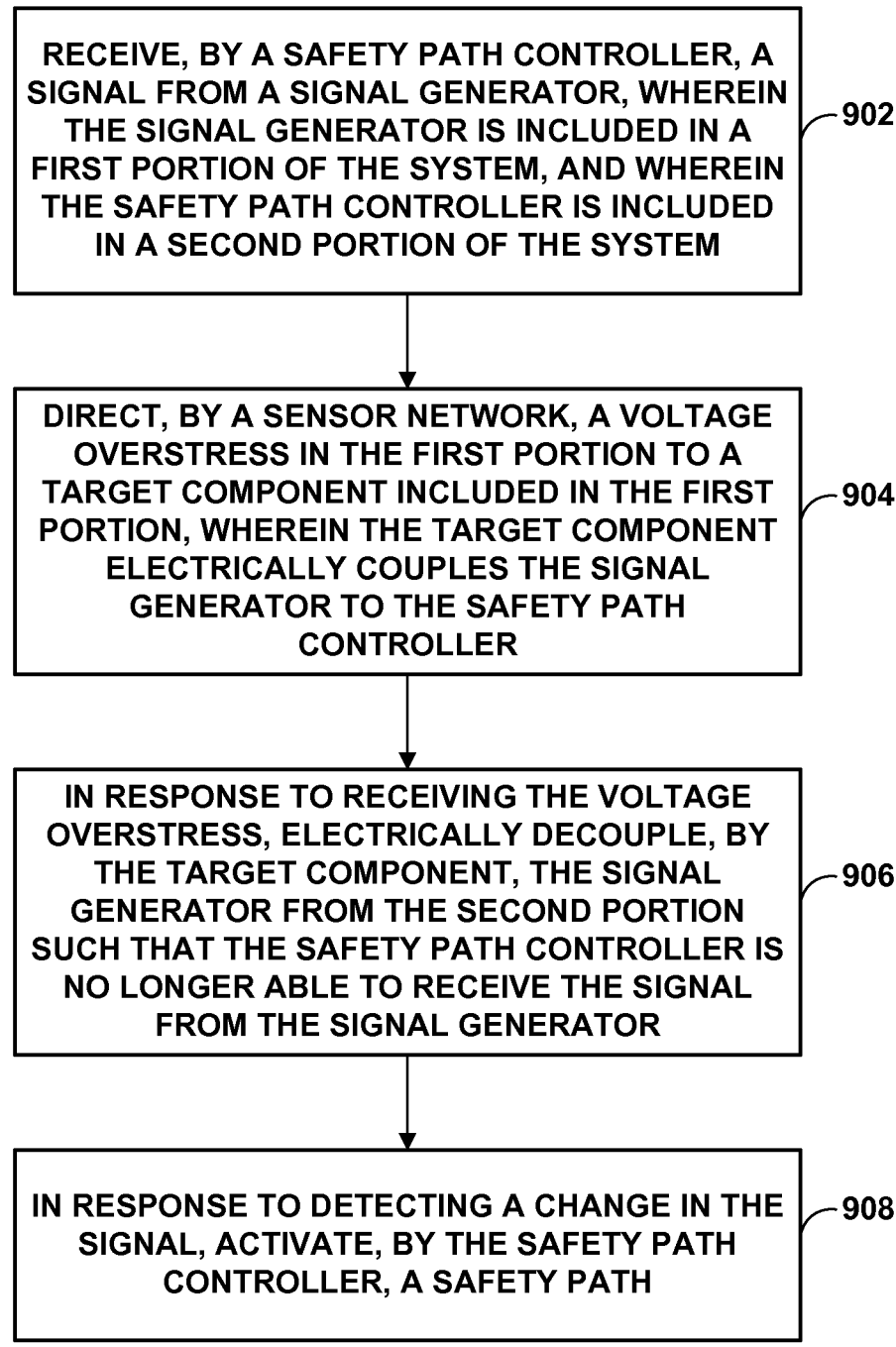
FIG. 9 is a flowchart illustrating example operations of a system that performs an application in compliance with a safety level, in accordance with one or more techniques of this disclosure.

FIG. 9 is a flowchart illustrating example operations of a system that performs an application in compliance with a safety level, in accordance with one or more techniques of this disclosure. For purposes of illustration only, the example operations are described below within the context of system 2, as shown in FIGS. 2-7.

In the example of FIG. 9, a safety path controller (e.g., detector 44), may receive a signal from a signal generator (e.g., oscillator 38), wherein the signal generator is included in a first portion of a system (e.g., safety functions portion 6), and wherein the safety path controller is included in a second portion of the system (e.g., safety path generator portion 10). The first portion may include one or more components rated to operate up to a first voltage level, and the second portion may include one or more components rated to operate up to a second voltage level. The second voltage level may be greater than the first voltage level.

A sensor network (e.g., high voltage domain monitoring system 100) may direct a voltage overstress in the first portion to a target component included in the first portion (e.g., target component 40). The target component may electrically couple the signal generator to the safety path controller.

In response to receiving the voltage overstress, the target component may electrically decouple the signal generator from the second portion such that the safety path controller is no longer able to receive the signal from the signal generator. In response to detecting a change in the signal, the safety path controller may activate a safety path (e.g., detector 44 may cause driver 46 to activate one or more of safety paths 24).

While described in the context of the power steering application, the techniques of this disclosure may be equally applicable to other applications. For instance, the techniques of this disclosure may be used to improve the safety and design of braking applications, acceleration applications, and the like.

EXAMPLE 1

A system comprising: a first portion comprising one or more components configured to implement one or more safety functions of an application, wherein the one or more of the components of the first portion are rated to withstand a supply voltage up to a first voltage level without sustaining a reduction in component lifetime, and wherein the one or more safety functions are associated with one or more safety goals; a second, different portion comprising one or more different components configured to activate a safety path in response to a detection of a voltage overstress in the first portion, wherein the one or more of the components of the second portion are rated to withstand a supply voltage up to a second voltage level without sustaining a reduction in component lifetime, wherein the second voltage level is greater than the first voltage level, and wherein by activating the safety path in response to the detection of the voltage overstress, the one or more safety goals are achieved; and a third, different portion comprising one or more different components configured to electrically couple the first portion to the second portion and to prevent the voltage overstress from propagating from the first portion to the second portion.

EXAMPLE 2

The system of example 1, wherein the first portion further comprises: a signal generator configured to output a signal to one or more of the components of the second portion; a target component configured to electrically couple the signal generator to one or more of the components of the second portion; and a sensor network configured to direct a voltage overstress to the target component, wherein the target component is configured to electrically decouple the signal generator from the one or more components of the second portion in response to sustaining a voltage overstress.

EXAMPLE 3

The system of any combination of examples 1-2, wherein the signal generator comprises an oscillator, and wherein the target component comprises a fuse.

EXAMPLE 4

The system of any combination of examples 1-3, wherein the sensor network is a high voltage domain sensor network configured to direct a voltage overstress in a high voltage supply domain to the target component, the system further comprising: a low voltage domain sensor network configured to direct a voltage overstress in a low voltage supply domain to a detector, wherein the detector is configured to activate the safety path in response to detecting a voltage overstress in the low voltage supply domain.

EXAMPLE 5

The system of any combination of examples 1-4, wherein the second portion further comprises: a detector configured to detect a signal output by one or more components of the first portion, wherein the detector is configured to activate the safety path in response to determining that the signal has changed.

EXAMPLE 6

The system of any combination of examples 1-5, wherein the detector is configured to determine that the signal has changed when the signal is no longer being received by the detector.

EXAMPLE 7

The system of any combination of examples 1-6, wherein the voltage overstress is detected if a supply voltage level of the first portion exceeds the first voltage level.

EXAMPLE 8

The system of any combination of examples 1-7, wherein the system is included in a vehicle, wherein the vehicle includes a battery and one or more steering wheels, wherein the application is power steering, wherein the second voltage level is a voltage level of the battery included in the vehicle, and wherein activation of the safety path prevents the system from modifying or preventing driver modification of an angle of the one or more steering wheels.

EXAMPLE 9

A system comprising: a first portion comprising one or more means for implementing one or more safety functions of an application, wherein the means of the first portion are rated to withstand a supply voltage up to a first voltage level without sustaining a reduction in lifetime, and wherein the one or more safety functions are associated with one or more safety goals; a second, different portion comprising means for activating a safety path in response to detecting a voltage overstress in the first portion, wherein the means of the second portion are rated to withstand a supply voltage up to a second voltage level without sustaining a reduction in lifetime, wherein the second voltage level is greater than the first voltage level, and wherein by activating the safety path in response to the detection of the voltage overstress, the one or more safety goals are achieved; and a third, different portion comprising means for electrically coupling the first portion to the second portion and to prevent the voltage overstress from propagating from the first portion to the second portion.

EXAMPLE 10

The system of example 9, wherein the voltage overstress is detected if a supply voltage level of the first portion exceeds the first voltage level.

EXAMPLE 11

The system of any combination of examples 9-10, wherein the first portion further comprises: means for outputting a signal to one or more of the components of the second portion; means for electrically coupling the signal generator to one or more of the components of the second portion; and means for directing a voltage overstress to the target component, wherein the means for electrically coupling the signal generator to one or more of the components of the second portion comprise means for electrically decoupling the signal generator from the one or more components of the second portion in response to sustaining a voltage overstress.

EXAMPLE 12

The system of any combination of examples 9-11, wherein the means for directing the voltage overstress are means for directing a voltage overstress in a high voltage supply domain, the system further comprising: means for detecting a voltage overstress in a low voltage supply domain; and means for directing the voltage overstress in the low voltage supply domain to the means for detecting the voltage overstress in the low voltage supply domain, wherein the means for detecting the voltage overstress in the low voltage supply domain include means for activating the safety path in response to detecting a voltage overstress in the low voltage supply domain.

EXAMPLE 13

The system of any combination of examples 9-12, wherein the safety path is a first safety path, wherein a supply system includes: the first portion; the second portion; and the third portion; wherein the system further comprises an actuator, wherein the actuator comprises: a fourth portion comprising one or more means for implementing one or more safety functions of the application, wherein the means of the fourth portion are rated to withstand a supply voltage up to the first voltage level without sustaining a reduction in lifetime; a fifth, different portion comprising means for activating a second safety path in response to detecting of a voltage overstress in the fourth portion, wherein the means of the fifth portion are rated to withstand a supply voltage up to the second voltage level without sustaining a reduction in lifetime, and wherein by activating the second safety path in response to the detection of the voltage overstress, the one or more safety goals are achieved; and a sixth, different portion comprising means for electrically coupling the third portion to the fourth portion and to prevent the voltage overstress from propagating from the fourth portion to the fifth portion.

EXAMPLE 14

A method performed by a system, the method comprising: receiving, by a safety path controller, a signal from a signal generator, wherein the signal generator is included in a first portion of a system, and wherein the safety path controller is included in a second portion of the system, wherein the first portion comprises one or more components rated to operate up to a first voltage level, wherein the second portion comprises one or more components rated to operate up to a second voltage level, and wherein the second voltage level is greater than the first voltage level; directing, by a sensor network, a voltage overstress in the first portion to a target component included in the first portion, wherein the target component electrically couples the signal generator to the safety path controller; preventing, by one or more different components of a third portion, the voltage overstress from propagating from the first portion to the second portion; in response to receiving the voltage overstress, electrically decoupling, by the target component, the signal generator from the second portion such that the safety path controller is no longer able to receive the signal from the signal generator; and in response to detecting a change in the signal, activating, by the safety path controller, a safety path.

EXAMPLE 15

The method of example 14, wherein the signal generator comprises an oscillator, and wherein the target component comprises a fuse.

EXAMPLE 16

The method of any combination of examples 14-15, wherein detecting a change in the signal comprises determining that the signal is no longer being received.

EXAMPLE 17

The method of any combination of examples 14-16, wherein activation of the safety path causes a switch to open.

EXAMPLE 18

The method of any combination of examples 14-17, wherein receiving a voltage overstress comprises receiving, by the target component, a voltage level greater than the first voltage level.

EXAMPLE 19

The method of any combination of examples 14-18, wherein the system is included in a vehicle, wherein the vehicle includes a battery and one or more steering wheels, wherein the one or more components of the first portion are configured to implement an application, wherein the application is power steering, wherein the second voltage level is a voltage level of the battery included in the vehicle, and wherein activating the safety path comprises: preventing the system from modifying or preventing driver modification of an angle of the one or more steering wheels.

EXAMPLE 20

The method of any combination of examples 14-19, wherein the sensor network is a high voltage domain sensor network, wherein directing the voltage overstress in the first portion comprises directing a voltage overstress in a high voltage supply domain of the first portion, the method further comprising: directing, by a low voltage domain sensor network, a voltage overstress in a low voltage supply domain of the first portion to a detector in the second portion; and in response to detecting the voltage overstress in the low voltage supply domain, activating, by the safety path controller, a safety path.

The techniques of this disclosure may be implemented in a wide variety of devices or apparatuses, with an integrated circuit (IC) or a set of ICs (i.e., a chip set). Various components, modules, or units are described in this disclosure to emphasize functional aspects of devices configured to perform the disclosed techniques, but do not necessarily require realization by different hardware units. Rather, various units may be combined in a hardware unit or provided by a collection of interoperative hardware units.

Various examples have been described. These and other examples are within the scope of the following claims.

The invention claimed is:

1. A system comprising:
a first portion comprising one or more components configured to implement one or more safety functions of an application, wherein the one or more of the components of the first portion are rated to withstand a supply voltage up to a first voltage level without sustaining a reduction in component lifetime, wherein the one or more safety functions are associated with one or more safety goals, and wherein the one or more components of the first portion are powered by a power source;
a second, different portion comprising one or more different components configured to activate a safety path in response to a detection of a voltage overstress in the first portion, wherein the one or more of the components of the second portion are rated to withstand a supply voltage up to a second voltage level without sustaining a reduction in component lifetime, wherein the second voltage level is greater than the first voltage level, wherein the one or more components of the second portion are powered by the same power source, and wherein by activating the safety path in response to the detection of the voltage overstress, the one or more safety goals are achieved; and
a third, different portion comprising one or more different components configured to electrically couple the first portion to the second portion and to prevent the voltage overstress from propagating from the first portion to the second portion.

2. The system of claim 1, wherein the first portion further comprises:
a signal generator configured to output a signal to one or more of the components of the second portion;
a target component configured to electrically couple the signal generator to one or more of the components of the second portion; and
a sensor network configured to direct a voltage overstress to the target component, wherein the target component is configured to electrically decouple the signal generator from the one or more components of the second portion in response to sustaining a voltage overstress.

3. The system of claim 2, wherein the signal generator comprises an oscillator, and wherein the target component comprises a fuse.

4. The system of claim 2, wherein the sensor network is a high voltage domain sensor network configured to direct a voltage overstress in a high voltage supply domain to the target component, the system further comprising:
a low voltage domain sensor network configured to direct a voltage overstress in a low voltage supply domain to a detector, wherein the detector is configured to activate the safety path in response to detecting a voltage overstress in the low voltage supply domain.

5. The system of claim 1, wherein the second portion further comprises:
a detector configured to detect a signal output by one or more components of the first portion, wherein the detector is configured to activate the safety path in response to determining that the signal has changed.

6. The system of claim 5, wherein the detector is configured to determine that the signal has changed when the signal is no longer being received by the detector.

7. The system of claim 1, wherein the voltage overstress is detected if a supply voltage level of the first portion exceeds the first voltage level.

8. The system of claim 1, wherein the system is included in a vehicle, wherein the power source is a battery included in the vehicle, wherein the vehicle includes one or more steering wheels, wherein the application is power steering, wherein the second voltage level is a voltage level of the battery included in the vehicle, and wherein activation of the safety path prevents the system from modifying or preventing driver modification of an angle of the one or more steering wheels.

9. A system comprising:
a first portion comprising one or more means for implementing one or more safety functions of an application, wherein the means of the first portion are rated to withstand a supply voltage up to a first voltage level without sustaining a reduction in lifetime, wherein the one or more safety functions are associated with one or more safety goals, and wherein the means of the first portion are powered by a power source;
a second, different portion comprising means for activating a safety path in response to detecting a voltage overstress in the first portion, wherein the means of the second portion are rated to withstand a supply voltage up to a second voltage level without sustaining a reduction in lifetime, wherein the second voltage level is greater than the first voltage level, wherein the means of the second portion are powered by the same power source, and wherein by activating the safety path in response to the detection of the voltage overstress, the one or more safety goals are achieved; and
a third, different portion comprising means for electrically coupling the first portion to the second portion and to prevent the voltage overstress from propagating from the first portion to the second portion.

10. The system of claim 9, wherein the voltage overstress is detected if a supply voltage level of the first portion exceeds the first voltage level.

11. The system of claim 9, wherein the first portion further comprises:
means for outputting a signal to one or more of the components of the second portion;
means for electrically coupling the signal generator to one or more of the components of the second portion; and
means for directing a voltage overstress to the target component, wherein the means for electrically coupling the signal generator to one or more of the components of the second portion comprise means for electrically decoupling the signal generator from the one or more components of the second portion in response to sustaining a voltage overstress.

12. The system of claim 11, wherein the means for directing the voltage overstress are means for directing a voltage overstress in a high voltage supply domain, the system further comprising:
   means for detecting a voltage overstress in a low voltage supply domain; and
   means for directing the voltage overstress in the low voltage supply domain to the means for detecting the voltage overstress in the low voltage supply domain, wherein the means for detecting the voltage overstress in the low voltage supply domain include means for activating the safety path in response to detecting a voltage overstress in the low voltage supply domain.

13. The system of claim 9, wherein the safety path is a first safety path, wherein a supply system includes:
   the first portion;
   the second portion; and
   the third portion;
   wherein the system further comprises an actuator, wherein the actuator comprises:
      a fourth portion comprising one or more means for implementing one or more safety functions of the application, wherein the means of the fourth portion are rated to withstand a supply voltage up to the first voltage level without sustaining a reduction in lifetime;
      a fifth, different portion comprising means for activating a second safety path in response to detecting of a voltage overstress in the fourth portion, wherein the means of the fifth portion are rated to withstand a supply voltage up to the second voltage level without sustaining a reduction in lifetime, and wherein by activating the second safety path in response to the detection of the voltage overstress, the one or more safety goals are achieved; and
      a sixth, different portion comprising means for electrically coupling the third portion to the fourth portion and to prevent the voltage overstress from propagating from the fourth portion to the fifth portion.

14. A method performed by a system, the method comprising:
   receiving, by a safety path controller, a signal from a signal generator, wherein the signal generator is included in a first portion of a system, and wherein the safety path controller is included in a second portion of the system,
   wherein the first portion comprises one or more components rated to operate up to a first voltage level, wherein the second portion comprises one or more components rated to operate up to a second voltage level, wherein the second voltage level is greater than the first voltage level, wherein the one or more components of the first portion are powered by a power source, and wherein the one or more components of the second portion are powered by the same power source;
   directing, by a sensor network, a voltage overstress in the first portion to a target component included in the first portion, wherein the target component electrically couples the signal generator to the safety path controller;
   preventing, by one or more different components of a third portion, the voltage overstress from propagating from the first portion to the second portion;
   in response to receiving the voltage overstress, electrically decoupling, by the target component, the signal generator from the second portion such that the safety path controller is no longer able to receive the signal from the signal generator; and
   in response to detecting a change in the signal, activating, by the safety path controller, a safety path.

15. The method of claim 14, wherein the signal generator comprises an oscillator, and wherein the target component comprises a fuse.

16. The method of claim 14, wherein detecting a change in the signal comprises determining that the signal is no longer being received.

17. The method of claim 14, wherein activation of the safety path causes a switch to open.

18. The method of claim 14, wherein receiving a voltage overstress comprises receiving, by the target component, a voltage level greater than the first voltage level.

19. The method of claim 13, wherein the system is included in a vehicle, wherein the power source is a battery included in the vehicle, wherein the vehicle includes one or more steering wheels, wherein the one or more components of the first portion are configured to implement an application, wherein the application is power steering, wherein the second voltage level is a voltage level of the battery included in the vehicle, and wherein activating the safety path comprises:
   preventing the system from modifying or preventing driver modification of an angle of the one or more steering wheels.

20. The method of claim 14, wherein the sensor network is a high voltage domain sensor network, wherein directing the voltage overstress in the first portion comprises directing a voltage overstress in a high voltage supply domain of the first portion, the method further comprising:
   directing, by a low voltage domain sensor network, a voltage overstress in a low voltage supply domain of the first portion to a detector in the second portion; and
   in response to detecting the voltage overstress in the low voltage supply domain, activating, by the safety path controller, a safety path.

* * * * *